United States Patent
Elorza Gomez et al.

(10) Patent No.: US 11,927,109 B2
(45) Date of Patent: Mar. 12, 2024

(54) GAS TURBINE BLADE

(71) Applicant: MTU Aero Engines AG, Munich (DE)

(72) Inventors: Sergio Elorza Gomez, Munich (DE); Tobias Froebel, Munich (DE); Nina Wolfrum, Munich (DE); Sebastian Mann, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/785,572

(22) PCT Filed: Dec. 8, 2020

(86) PCT No.: PCT/DE2020/000324
§ 371 (c)(1),
(2) Date: Jun. 15, 2022

(87) PCT Pub. No.: WO2021/121456
PCT Pub. Date: Jun. 24, 2021

(65) Prior Publication Data
US 2023/0026899 A1     Jan. 26, 2023

(30) Foreign Application Priority Data

Dec. 20, 2019    (DE) .................. 10 2019 220 493.7

(51) Int. Cl.
*F01D 5/14*     (2006.01)

(52) U.S. Cl.
CPC ............ *F01D 5/141* (2013.01); *F01D 5/142* (2013.01); *F05D 2220/323* (2013.01);
(Continued)

(58) Field of Classification Search
CPC .... F01D 5/141; F01D 5/142; F05D 2220/323; F05D 2240/12; F05D 2240/301; F05D 2250/70; Y02T 50/60
See application file for complete search history.

(56) References Cited

U.S. PATENT DOCUMENTS

| 3,333,817 A   | 8/1967 | Rhomberg |
| 5,779,443 A * | 7/1998 | Haller ................... F01D 9/02 |
|               |        | 415/914 |

(Continued)

FOREIGN PATENT DOCUMENTS

| DE | 2144600 A   | 3/1973 |
| EP | 1505302 A1  | 2/2005 |

(Continued)

*Primary Examiner* — Brian Christopher Delrue
(74) *Attorney, Agent, or Firm* — Hinckley, Allen & Snyder, LLP; David R. Josephs

(57) ABSTRACT

The present invention relates to a blade for a gas turbine, in particular of an aircraft engine, having a blade airfoil, which has a blade-root-side first profile section and a blade-tip-side second profile section, which is spaced apart from the first profile section in a radial direction, from the first profile section to the second profile section, by a blade airfoil height, wherein a stagger angle of the blade airfoil changes with a height in the radial direction over the first profile section at least over certain portions, wherein, in a first region between a first height and a second, greater height, the change in the stagger angle over the height does not decrease with increasing height at least over certain portions.

7 Claims, 2 Drawing Sheets

(52) U.S. Cl.
CPC .... *F05D 2240/12* (2013.01); *F05D 2240/301* (2013.01); *F05D 2250/70* (2013.01)

(56) References Cited

U.S. PATENT DOCUMENTS

| | | |
|---|---|---|
| 6,899,526 B2 | 5/2005 | Doloresco et al. |
| 9,605,542 B2 | 3/2017 | Gallagher et al. |
| 9,988,908 B2 | 6/2018 | Gallagher et al. |
| 10,208,765 B2 * | 2/2019 | Froebel ................ F01D 5/141 |
| 10,801,325 B2 * | 10/2020 | Mongillo ............. F01D 5/141 |
| 2005/0031454 A1 * | 2/2005 | Doloresco ............ F01D 5/141 |
| | | 416/238 |
| 2008/0226454 A1 | 9/2008 | Decker et al. |
| 2012/0243983 A1 * | 9/2012 | Breeze-Stringfellow ............... |
| | | F01D 5/148 |
| | | 415/208.1 |
| 2014/0154087 A1 * | 6/2014 | Kirchner ............ F01D 5/141 |
| | | 416/223 R |
| 2018/0274368 A1 * | 9/2018 | Mongillo ............. F01D 5/141 |
| 2021/0381382 A1 * | 12/2021 | Nolcheff ............. F01D 5/141 |
| 2022/0372878 A1 * | 11/2022 | Healy ................ F04D 19/028 |
| 2022/0372879 A1 * | 11/2022 | Blohm ................ F01D 5/141 |
| 2023/0026899 A1 * | 1/2023 | Elorza Gomez ........ F01D 5/141 |

FOREIGN PATENT DOCUMENTS

| | | |
|---|---|---|
| EP | 2226468 A2 | 9/2010 |
| EP | 2827003 A1 | 1/2015 |
| EP | 2473743 B1 | 7/2015 |
| GB | 2106192 A | 4/1983 |
| WO | 2019012102 A1 | 1/2019 |
| WO | WO-2019012102 A1 * | 1/2019 |

\* cited by examiner

GAS TURBINE BLADE

The work that has led to this invention was funded as part of the 7th Framework Program (FP7/2007-2013) under Grant Agreement Number ACP1-GA-2011-283216-LEMCOTEC ("Low Emissions Core-Engine Technologies").

BACKGROUND OF THE INVENTION

The present invention relates to a blade for a gas turbine, in particular of an aircraft engine, a rotating blade cascade or a guide vane cascade for a compressor stage or a turbine stage of a gas turbine, in particular of an aircraft engine, with the blade, a compressor stage or a turbine stage for a gas turbine, in particular of an aircraft engine, with the rotating blade cascade or the guide vane cascade, as well as a gas turbine, in particular an aircraft engine gas turbine, with the compressor stage or the turbine stage.

SUMMARY OF THE INVENTION

An object of an embodiment of the present invention is to improve the performance of a gas turbine.

This object is achieved by a blade in accordance with the present invention. Described in detail below is a rotating blade cascade or a guide vane cascade for a compressor stage or a turbine stage of a gas turbine with one or a plurality of the blades described here as well as a corresponding compressor stage or turbine stage or gas turbine of the present invention. Advantageous embodiments of the invention are also discussed below.

In accordance with an embodiment of the present invention, (at least) one blade for or of a gas turbine or for or of a compressor stage or a turbine stage or for or of a rotating blade cascade or a guide vane cascade has a blade airfoil for this purpose, wherein the blade airfoil has a blade-root-side first profile section and a blade-tip-side second profile section, which is spaced apart from the first profile section in a radial direction, from the first profile section to the second profile section, by a blade airfoil height.

In an embodiment, the blade is a guide vane, preferably a shroudless guide vane, for or of a guide vane cascade or—preferably—a rotating blade, preferably a shroudless rotating blade, for or of a rotating blade cascade or a rotor for or of a turbine stage or—preferably—a compressor stage of the gas turbine, which, in turn, is preferably an aircraft engine gas turbine.

For this purpose, that is, especially for rotating blades or rotor blades of (aircraft engine) gas turbine compressors (rotor vane cascades), the present invention can be utilized with special advantage on account of the thermal, mechanical, and aerodynamic constraints.

In an embodiment, in the conventional technical way, an axial direction is parallel to a rotational axis or (main) machine axis of the gas turbine or compressor stage or turbine stage or of the rotating blade cascade or the guide vane cascade; a peripheral direction is a rotational direction around this axis; and a or the radial direction is perpendicular to the axial and peripheral directions; that is, in the case of a rotating blade, correspondingly away from this axis, and, in the case of a guide vane, correspondingly toward this axis. Accordingly, in the case of a—preferred—rotating blade, the blade-root-side first profile section is a radially innermost profile section or profile section closest to the rotational axis and, in the case of a guide vane, the blade-tip-side second profile section is a radially outermost profile section or profile section closest to the housing, and, in the case of a—preferred—rotating blade, the blade-tip-side second profile section is a radially outermost profile section or profile section closest to the housing and, in the case of a guide vane, a radially innermost profile section or profile section closest to the rotational axis. In an embodiment, the blade height is a maximum, minimum, or mean blade height or a blade height at a leading edge or trailing edge of the blade airfoil.

In an embodiment, a or each profile section has (respectively) a stagger angle $\beta$. In the present instance, in an embodiment, in the conventional technical way, this is understood to mean the angle between a profile chord of the profile section and the axial direction, wherein, in an embodiment, in a conventional technical way, the profile chord is a straight line between the leading edge and the trailing edge of the profile section.

In accordance with an embodiment of the present invention, the (this) stagger angle changes with or over the height R in the radial direction over the first profile section at least over certain portions ($\beta=\beta(R)$, wherein for the first profile section R=0 and for at least two different heights $R_i$, $R_j$, the following is valid: $\beta(R_i) \neq \beta(R_j)$).

In an embodiment, this change in the stagger angle over or with the height R (in the radial direction) changes with or over the height R in the radial direction over the first profile section at least over certain portions ($d\beta/dR=(d\beta/dt)(R)$, wherein, for at least two different heights $R_i$, $R_j$, the following is valid: $(d\beta/dR)(R_i) \#(d\beta/dR)(R_j)$).

In accordance with an embodiment of the present invention, in a first region $[R_1, R_2]$ of the height R in the radial direction over the first profile section between a first height $R_1$ and a second, greater height $R_2$, in turn, the (this) change $(d\beta/dR)(R)$ in the stagger angle $\beta$ of the blade airfoil does not decrease over the height R with increasing height (in the radial direction) at least over certain portions, preferably over at least 50%, more preferably at least 75%, in particular at least 90%, in an embodiment 100% of this first region. In an embodiment, the change $(d\beta/dR)(R)$ in the first region $[R_1, R_2]$ between the first height $R_1$ and the second height $R_2$ increases with increasing height (in the radial direction) at least over certain portions, preferably over at least 50%, more preferably at least 75%, in particular at least 90%, in an embodiment 100% of this first region, in an embodiment monotonically $(R_i > R_j \Rightarrow (d\beta/dR)(R_i) \geq (d\beta/dR)(R_j))$, in a further development strictly monotonically $(R_i > R_j \Rightarrow (d\beta/dR)(R_i) > (d\beta/dR)(R_j))$.

In accordance with an embodiment of the present invention, the change $(d\beta/dR)(R)$ in the stagger angle $\beta$ of the blade airfoil over the height R decreases in a second region $[R_1, R_2]$ of the height R, which adjoins the first region, between the second height $R_2$ and a third, (still) greater height $R_3$ with increasing height (in the radial direction) at least over certain portions, preferably over at least 50%, more preferably at least 75%, in particular at least 90%, in an embodiment 100% of this second region, in an embodiment monotonically $(R_i > R_j \Rightarrow (d\beta/dR)(R_i) \leq (d\beta/dR)(R_j))$, in a further development strictly monotonically $(R_i > R_j \Rightarrow (d\beta/dR)(R_i) < (d\beta/dR)(R_j))$.

In accordance with an embodiment of the present invention, the first height represents at least 30% and at most 60% of the blade airfoil height, the second height represents at least 50% and at most 80% of the blade airfoil height, and the third height represents at least 80% and at most 100% of the blade airfoil height.

Surprisingly, it has been found that, by way of such a design in the region closer to the blade tip, in particular in the case of rotating blades, in particular of gas turbine compressors (compressor stages), the sensitivity toward a variation, in particular a thermal, centrifugally related, or age-related variation, in particular an enlargement, of a radial gap between the rotor and the stator can be reduced by up to 25% in an embodiment. In an embodiment, it is possible in this way to increase the efficiency of the gas turbine. In an embodiment, it is possible through such a design to reduce a pump surge margin that is to be reserved, and, in this way, in a further development, to increase efficiency. Additionally or alternatively, in an embodiment, it is possible through such a design to realize a high aspect ratio (HAR) with no or with only small (smaller) sacrifice in stability.

In an embodiment, the change in the stagger angle over the height (in the radial direction) in an end region between 90% and 100% of the blade airfoil height at least over certain portions, preferably at least between 97% and 100% of the blade airfoil height, more preferably at least between 95% and 100% of the blade airfoil height, and, in an embodiment, at least between 90% and 100% of the blade airfoil height, is negative ($d\beta/dR<0$). In other words, the stagger angle in this (section of the) end region decreases with increasing height in the radial direction.

In an embodiment, it is possible in this way, in particular, to reduce the sensitivity toward a variation, in particular a thermal, centrifugally related, or age-related variation, in particular an enlargement, of a radial gap between the rotor and the stator and/or an outflow from the blade airfoil in an especially advantageous manner.

In an embodiment, a profile section has a "camber" line or profile centerline. This is understood in the present instance, in particular in a conventional technical way, to mean the connecting line of the midpoints of the circles inscribed in the profile section.

In an embodiment, the blade airfoil or its profile sections has, in an embodiment of the camber lines or profile centerlines thereof, in an S-shaped region of the height between an initial height, which represents at least 80% of the blade airfoil height, and the blade airfoil height at least over certain portions, and, in an embodiment, in 100% of this S-shaped region, an S-shaped portion or two adjoining curvatures that are opposite to each other at a point of inflection. In an embodiment, the blade airfoil or its profile sections has, in an embodiment of the camber lines or profile centerlines thereof, in the S-shaped region of the height between the initial height and the blade airfoil height in 100% of this S-shaped region, an S-shaped portion or two adjoining curvatures that are opposite to each other at a point of inflection, wherein the initial height represents at least 90% of the blade airfoil height or at least 95% of the blade airfoil height.

In a further development, a or the point of inflection of the S-shaped portion lies in at least one profile section of the S-shaped region, preferably at least in the second profile section or uppermost profile section of the S-shaped region, in a middle third of this profile section.

Additionally or alternatively, in an embodiment, a or the inflection point of the S-shaped portion is further distant from a trailing edge than in at least one other profile section of the S-shaped region that is closer to the first profile section. In an embodiment, the inflection point migrates with increasing height away from the trailing edge, in particular towards the middle third of the profile section.

Additionally or alternatively, in an embodiment, a or the inflection point of the S-shaped portion for the initial height arrives in the trailing edge.

Additionally or alternatively, in an embodiment, the stagger angle in an end region between 95% and 100% of the blade airfoil height at least over certain portions, preferably at least between 97% and 100% of the blade airfoil height, more preferably at least between 95% and 100% of the blade airfoil height, in an embodiment at least between 90% and 100% of the blade airfoil height, is smaller than a trailing edge angle, in particular of the corresponding profile section.

In this way, in an embodiment, it is possible in each instance, in particular in combination of two or more of these features, to reduce in an advantageous manner the stagger angle and thereby to influence not at all or little (less) an angle of outflow and/or an angle of incidence between the flow angle and the metal angle. It is thereby possible in an embodiment to reduce advantageously any intensification of a gap vortex, which is created at a leading edge of the blade tip, by a downstream flow across the blade tip.

In an embodiment, a profile center of gravity in at least one profile section of the second region is displaced with respect to the profile center of gravity in at least one profile section of the second region that is closer to the first profile section toward the suction side of the blade airfoil. In an embodiment, the radial course of the positions of the profile center of gravity is inclined, starting at the second height, in the direction of the suction side of the blade airfoil ("dihedrally" to the suction side). In an embodiment, in particular as a result thereof, the dihedral angle of the trailing edge on the second profile section is zero or positive.

In an embodiment, it is thereby possible, in particular, to improve the sensitivity to, in particular, a thermal, centrifugally related, or age-related variation, in particular an enlargement, of a radial gap between the rotor and the stator in an especially advantageous manner and/or to improve an outflow from the blade airfoil.

BRIEF DESCRIPTION OF THE DRAWING FIGURES

Other advantageous further developments of the present invention ensue from the dependent claims and the following description of preferred embodiments. For this purpose and in part schematically:

DESCRIPTION OF THE INVENTION

Figure 4:
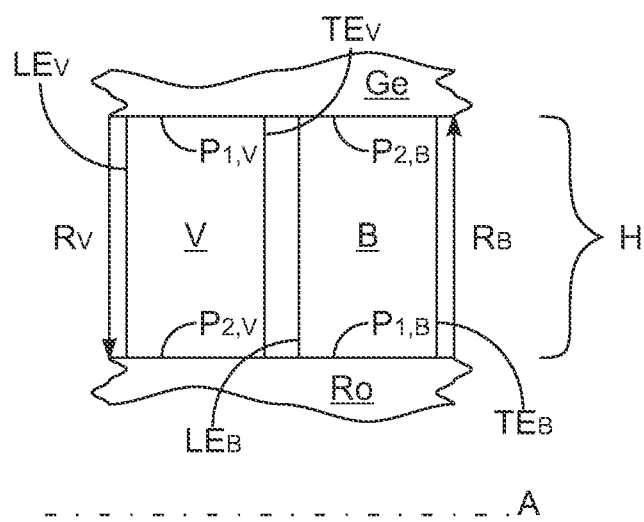
FIG. 4 shows a meridional section of a part of a gas turbine with the blade.

FIG. 4 shows a meridional section of a part of a gas turbine in accordance with an embodiment of the present invention with a guide vane having a blade airfoil V, which is arranged on a housing Ge, and a rotating blade having a blade airfoil B, which is arranged on a rotor disk Ro.

$LE_V$ and $LE_B$ indicate an upstream leading edge, $TE_V$ and $TE_B$ a downstream trailing edge, $P_{1,V}$ and $P_{1,B}$ a blade-root-side first profile section, $P_{2,V}$ and $P_{2,B}$ a blade-tip-side second profile section, and $R_V$ and $R_B$ a radial direction from the first profile section $P_{1,V}$ and $P_{1,B}$ to the second profile section $P_{2,V}$ and $P_{2,B}$, in which the second profile section is spaced apart from the first profile section by a blade airfoil height H.

Figure 2:
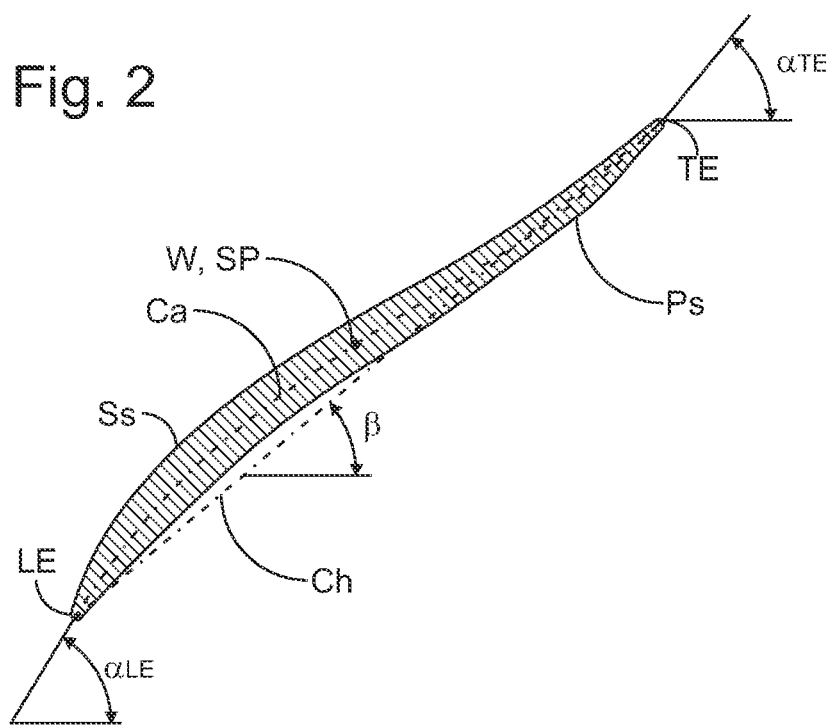
FIG. 2 shows another profile section of the blade at greater height in the radial direction.
Figure 1:
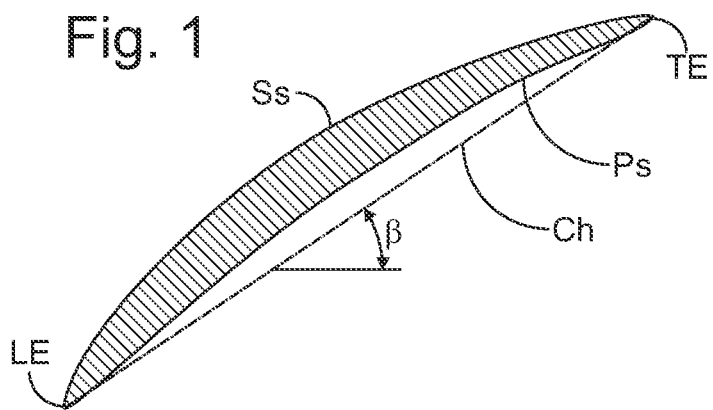
FIG. 1 shows a profile section of a blade in accordance with an embodiment of the present invention.

The blade of FIGS. 1, 2 can be the guide vane with the blade airfoil V or the rotating blade with the blade airfoil B of FIG. 4.

Accordingly, in FIGS. 1, 2, the leading edge is indicated uniformly by LE, the trailing edge by TE. Ps and Ss in FIGS. 1, 2 indicate a pressure side and suction side, respectively, β indicates a stagger angle of the profile section or an angle between its profile chord Ch and the axial direction (see FIG. 4) parallel to the rotational axis A, Ca in FIG. 1 indicates the camber line or profile centerline of the profile section, and $\alpha_{LE}$ and $\alpha_{TE}$ indicate a leading edge angle and a trailing edge angle, respectively.

The stagger angle β of the profile section of FIG. 2 is smaller than the trailing edge angle $\alpha_{TE}$ of the profile section.

Figure 3:
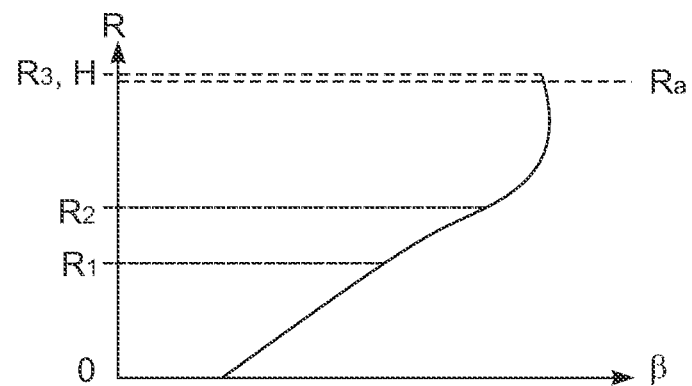
FIG. 3 shows a stagger angle $\beta$ of the blade over the height R in the radial direction.

FIG. 3 shows the course of the stagger angle β over the height R in the radial direction (see FIG. 4).

In this case, $R_1$ indicates a first height over the first profile section, which represents at least 30% and at most 60% of the blade airfoil height H (see FIG. 4), $R_2$ a second, greater height than the first profile section, which represents at least 50% and at most 80% of the blade airfoil height H, $R_3$ a third, still greater height than the first profile section, which represents at least 80% and at most 100% of the blade airfoil height H, and $R_a$ an initial height over the first profile section, which, in the exemplary embodiment, represents 97% of the blade airfoil height H.

The stagger angle β of the blade airfoil changes over or with the height R in the radial direction at least over certain portions (β=β(R)), wherein this change dβ/dR in the stagger angle β over the height increases with increasing height in a first region [$R_1$, $R_2$] between the first and second heights $R_1$, $R_2$ and, in an adjoining second region [$R_2$, $R_3$], decreases with increasing height between the second and third height $R_2$, $R_3$ and is thereby negative in a blade-tip-side end region of the blade airfoil.

The profile section of FIG. 2 lies in an S-shaped region of the height between 97% and 100% of the blade airfoil height H. The profile section or its camber line or profile centerline Ca has an S-shaped portion with an inflection point W, which, in the exemplary embodiment, coincides only coincidentally with a profile center of gravity SP.

The inflection point W lies in a middle third of the profile section. With decreasing height, it migrates toward the trailing edge and finally arrives at the lower end of the S-shaped region in this S-shaped region.

Although, in the preceding description, exemplary embodiments were explained, it is noted here that a large number of modifications are possible. Moreover, it is noted that the exemplary embodiments involve merely examples, which are not intended to limit the protective scope, the applications, and the construction in any way. Instead, the preceding description is intended to afford the person skilled in the art a guideline for the implementation of at least one exemplary embodiment, whereby diverse modifications, in particular in regard to the function and arrangement of the described component parts, can be made without leaving the protective scope as ensues from the claims and the combinations of features equivalent to these.

What is claimed is:

1. A blade for a gas turbine of an aircraft engine, comprising:
a blade airfoil, having a leading edge and a trailing edge, which has a blade-root-side first profile section and a blade-tip-side second profile section, which is spaced apart from the first profile section in a radial direction, from the first profile section to the second profile section, by a blade airfoil height, wherein a stagger angle of the blade airfoil changes with a height in the radial direction over the first profile section at least over certain portions, wherein, in a first region between a first height and a second, greater height, wherein the stagger angle comprises a change over the height that does not decrease with increasing height at least over certain portions, and in an adjoining second region between the second height and a third, greater height, the change in the stagger angle decreases with increasing height at least over certain portions, the first height representing at least 30% and at most 60% of the blade airfoil height, the second height representing at least 50% and at most 80% of the blade airfoil height, and the third height representing at least 80% and at most 100% of the blade airfoil height;
wherein the blade airfoil has a portion with an S-shaped profile in at least one cross-sectional portion at the third height of the airfoil.

2. The blade according to claim 1, wherein the change in the stagger angle over the height in an end region between 90% and 100% of the blade airfoil height is negative at least over certain portions.

3. The blade according to claim 1, wherein the S-shaped profile is defined by a camber line with two adjoining curvatures that are opposite to one another at an inflection point.

4. The blade according to claim 3, wherein the inflection point lies in a middle third of the S-shaped profile and/or is further distant from a trailing edge than in at least one profile section of a region of the S-shaped profile that is closer to the first profile section, and/or the inflection point of the S-shaped profile is located proximal to the trailing edge at the initial height.

5. The blade according to claim 1, wherein the stagger angle in an end region between 95% and 100% of the blade airfoil height is smaller at least over certain portions than an angle between the camber line and an axis of rotation at the trailing edge of the airfoil.

6. The blade according to claim 1, wherein a profile center of gravity in at least one profile section of the second region is displaced with respect to the profile center of gravity in at least one profile section of the second region that is closer to the first profile section toward a suction side of the blade airfoil.

7. The blade according to claim 1, wherein at least one blade is configured and arranged in a rotating blade cascade or a guide vane cascade for a compressor stage or a turbine stage of a gas turbine of an aircraft engine.

* * * * *